(12) United States Patent
Jang et al.

(10) Patent No.: US 11,212,756 B2
(45) Date of Patent: Dec. 28, 2021

(54) METHOD AND APPARATUS FOR SUPPORTING POWER BACKOFF REPORT WHILE PERFORMING POWER HEADROOM REPORT IN WIRELESS COMMUNICATION SYSTEM

(71) Applicant: Samsung Electronics Co., Ltd., Gyeonggi-do (KR)

(72) Inventors: Jaehyuk Jang, Gyeonggi-do (KR); Soenghun Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/092,697

(22) Filed: Nov. 9, 2020

(65) Prior Publication Data

US 2021/0144653 A1 May 13, 2021

(30) Foreign Application Priority Data

Nov. 8, 2019 (KR) .......................... 10-2019-0142939
Dec. 2, 2019 (KR) .......................... 10-2019-0158580

(51) Int. Cl.
*H04W 52/36* (2009.01)

(52) U.S. Cl.
CPC ................................ *H04W 52/365* (2013.01)

(58) Field of Classification Search
CPC ...... H04L 43/16; H04W 24/10; H04W 52/04; H04W 52/143; H04W 52/242; H04W 52/286; H04W 52/346; H04W 52/365; H04W 52/50; H04W 52/56; H04W 72/0406; H04W 72/0413; H04W 72/0473;

(Continued)

(56) References Cited

U.S. PATENT DOCUMENTS

2013/0280933 A1* 10/2013 Becavin ................. H01R 13/74
439/153
2015/0195795 A1* 7/2015 Loehr .................. H04W 52/365
455/522

(Continued)

FOREIGN PATENT DOCUMENTS

JP 2019-519986 7/2019
KR 1020190085422 7/2019

OTHER PUBLICATIONS

Huawei et al., "Correction of NR Test Case 7.1.1.3.7-PHR", R5-197024, 3GPP TSG-RAN5 Meeting #84, Aug. 26-30, 2019, 9 pages.

(Continued)

*Primary Examiner* — John J Lee
(74) *Attorney, Agent, or Firm* — The Farrell Law Firm, P.C.

(57) ABSTRACT

The disclosure relates to a communication technique for converging a 5G communication system for supporting a higher data transfer rate beyond a 4G system with an IoT technology, and a system therefor. The disclosure may be applied to intelligent services based on a 5G communication technology and an IoT-related technology. Methods and apparatuses are provided in which a PHR configuration including a threshold and a prohibit timer are received from a base station. It is identified whether a PHR is triggered based on the PHR configuration. The PHR is transmitted to the base station in case that the PHR is triggered. The PHR includes a bit field indicating a power backoff that is applied based on power management in case that a P field is set to 1.

11 Claims, 10 Drawing Sheets

(58) Field of Classification Search
CPC ............. H04W 72/04; H04W 72/1268; H04W 72/1284; H04W 88/02; H04W 88/08; H04W 88/12; H04W 24/08
USPC .............................. 455/522, 69, 452.1, 509
See application file for complete search history.

(56) References Cited

U.S. PATENT DOCUMENTS

2016/0302162 A1\*  10/2016  Park ...................... H04W 72/04
2017/0347326 A1   11/2017  Dinan
2019/0215862 A1    7/2019  Kim et al.
2019/0268861 A1    8/2019  Takeda et al.
2020/0280933 A1\*  9/2020  Liu ................... H04W 72/0413

OTHER PUBLICATIONS

Ericsson, "Running MAC CR for NR-U", R2-1914026, 3GPP TSG-RAN2 # 107bis, Oct. 14-18, 2019, 84 pages.
International Search Report dated Feb. 22, 2021 issued in counterpart application No. PCT/KR2020/015645, 3 pages.

\* cited by examiner

METHOD AND APPARATUS FOR SUPPORTING POWER BACKOFF REPORT WHILE PERFORMING POWER HEADROOM REPORT IN WIRELESS COMMUNICATION SYSTEM

CROSS-REFERENCE TO RELATED APPLICATION(S)

This application is based on and claims priority under 35 U. S. C. § 119(a) to Korean Patent Application Number 10-2019-0142939 filed in the Korean intellectual Property Office on Nov. 8, 2019, and to Korean Patent Application Number 10-2019-0158580, filed in the Korean Intellectual Property Office on Dec. 2, 2019, the disclosure of each of which is incorporated herein by reference in its entirety.

BACKGROUND

1. Field

The disclosure relates generally to an operation of a terminal and a base station in a wireless communication system and, more particularly, to a method for reporting transmission power headroom by a terminal in a wireless communication system.

2. Description of Related Art

To meet the demand for wireless data traffic that has increased since deployment of 4G communication systems, efforts have been made to develop an improved 5G or pre-5G communication system. Therefore, the 5G or pre-5G communication system is also referred to as a "beyond 4G network" or a "post LTE system". The 5G communication system is considered to be implemented in higher frequency (mmWave) bands (e.g., 60 GHz bands), so as to accomplish higher data rates. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques are discussed in 5G communication systems. In addition, in 5G communication systems, development of system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, hybrid frequency shift keying (FSK) and quadrature amplitude modulation (QAM) modulation (FQAM) and sliding window superposition coding (SWSC) have been deployed as an advanced coding modulation (ACM), and filter bank multi carrier (FBMC), non-orthogonal multiple access (NOMA), and sparse code multiple access (SCMA) have been deployed as an advanced access technology.

The Internet is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered an example of convergence of the 5G technology with the IoT technology.

SUMMARY

The disclosure provides a method in which, when a terminal reports the transmission power headroom (PH) in a wireless communication system, the terminal informs a base station that a power backoff has been performed.

According to the disclosure, the terminal can separately adjust a power headroom report resulting from the occurrence of a power backoff such that, when the corresponding situation occurs, the base station can be instantly informed of the corresponding fact and can perform scheduling according to the transmission power of the terminal.

According to an embodiment, a method performed by a terminal comprises receiving, from a base station, a power headroom reporting (PHR) configuration including a threshold and a prohibit timer for power management based on maximum power reduction; identifying whether a PHR is triggered based on the PHR configuration; and transmitting, to the base station, the PHR in case that the PHR is triggered, wherein the PHR includes a bit field indicating a power backoff that is applied based on the power management in case that a P field is set to 1.

According to an embodiment, a method performed by a base station comprises transmitting, to a terminal, a power headroom reporting (PHR) configuration including a threshold and a prohibit timer for power management based on maximum power reduction; and receiving, from the terminal, a PHR in case that the PHR is triggered, wherein the PHR is triggered based on the PHR configuration, wherein the PHR includes a bit field indicating a power backoff that is applied based on the power management in case that a P field is set to 1.

According to an embodiment, a terminal is provided that includes a transceiver and a controller coupled with the transceiver. The controller is configured to receive, from a base station, a power headroom reporting (PHR) configuration including a threshold and a prohibit timer for power management based on maximum power reduction, identify whether a PHR is triggered based on the PHR configuration, and transmit, to the base station, the PHR in case that the PHR is triggered, wherein the PHR includes a bit field indicating a power backoff that is applied based on the power management in case that a P field is set to 1.

According to an embodiment, a base station is provide that includes a transceiver and a controller coupled with the transceiver. The controller is configured to transmit, to a terminal, a power headroom reporting (PHR) configuration including a threshold and a prohibit timer for power management based on maximum power reduction, and receive, from the terminal, a PHR in case that the PHR is triggered, wherein the PHR is triggered based on the PHR configuration, wherein the PHR includes a bit field indicating a power backoff that is applied based on the power management in case that a P field is set to 1.

BRIEF DESCRIPTION OF THE DRAWINGS

The above and other aspects, features, and advantages of the disclosure will be more apparent from the following description when taken in conjunction with the accompanying drawings, in which.

DETAILED DESCRIPTION

Figure 1:
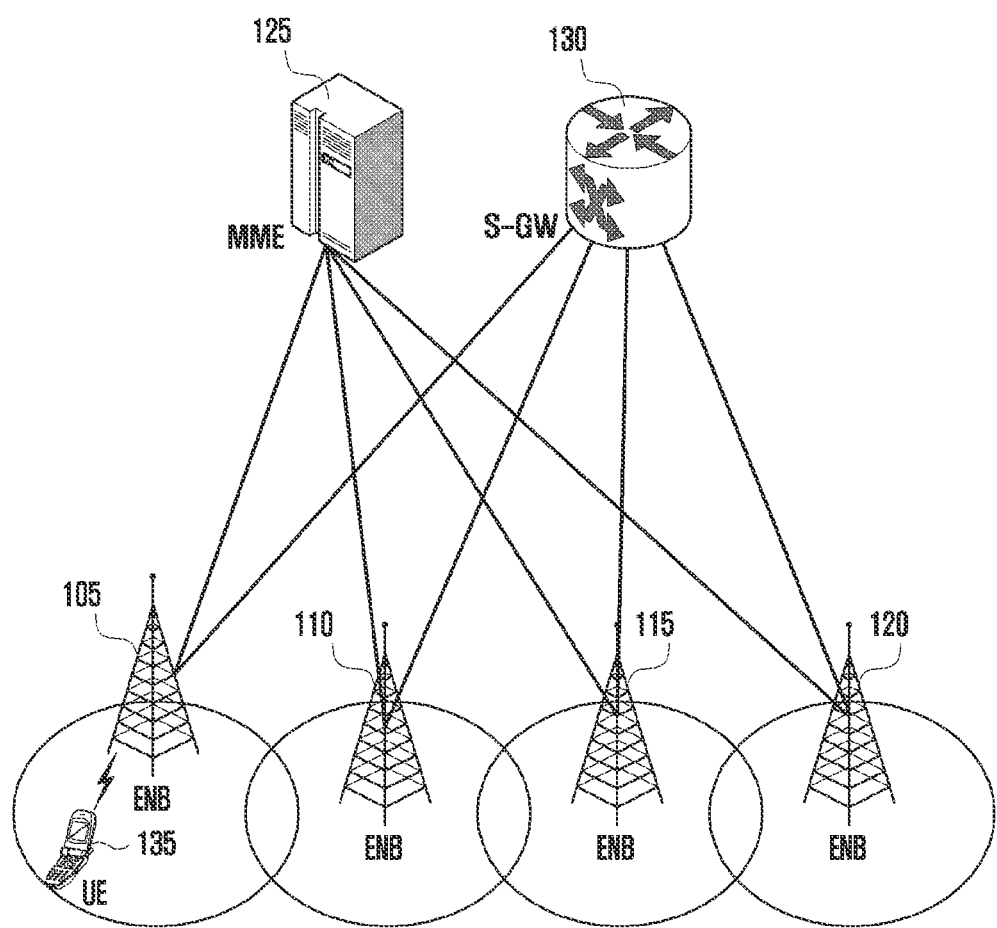
FIG. 1 is a diagram illustrating a structure of an LTE system, according to an embodiment.

Embodiments of the disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the disclosure.

The terms described below are defined in consideration of the functions in the disclosure, and may be different according to users, intentions of the users, or customs. Therefore, the definitions of the terms should be made based on the contents throughout the specification.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

Herein, the disclosure will be described using terms and names defined in the 3rd generation partnership project long term evolution (3GPP LTE) standards, which are the latest standards among the existing communication standards, for the convenience of description. However, the disclosure is not limited by these terms and names, and may be applied in the same way to systems that conform other standards. In particular, the disclosure may be applied to the 3GPP NR (New Radio; 5th generation mobile communication standards).

FIG. 1 is a diagram illustrating a structure of an LTE system, according to an embodiment.

Referring to FIG. 1, the wireless communication system includes multiple base stations 105, 110, 115, and 120, a mobility management entity (MME) 125, and a serving-gateway (S-GW) 130. A user equipment (UE or terminal) 135 may access an external network through the base stations 105, 110, 115, and 120 and the S-GW 130.

The base stations 105, 110, 115, and 120 are access nodes of a cellular network, and may provide wireless access to UEs connected to the network. That is, in order to service users' traffic, the base stations 105, 110, 115, and 120 may support connection between the UEs and a core network (CN) by collecting state information, such as buffer states, available transmission power states, and channel states of UEs and performing scheduling thereof. The MME 125 is a device for performing various control functions as well as a mobility management function for the UE and is connected to multiple base stations, and the S-GW 130 provides a data bearer. The MME 125 and the S-GW 130 may further perform authentication and bearer management for a terminal connected to the network, and process packets to be transmitted to the base station, and may process packets arriving from the base station 105, 110, 115, and 120 or packets to be transferred to the base station 105, 110, 115, and 120.

Figure 2:
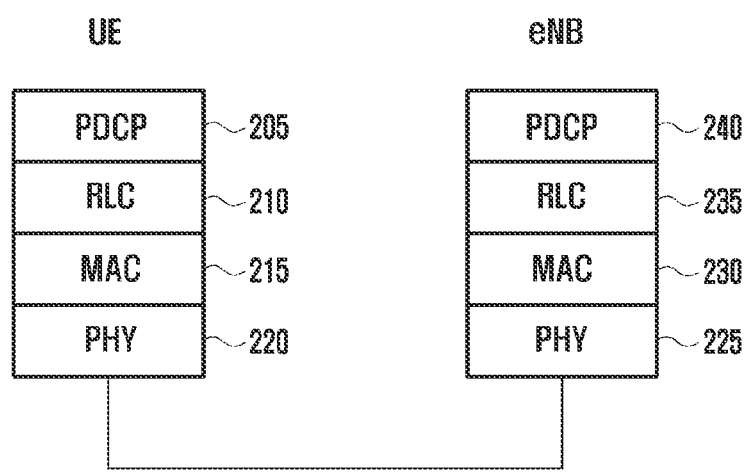
FIG. 2 is a diagram illustrating a radio protocol structure in an LTE system, according to an embodiment.

FIG. 2 is a diagram illustrating a radio protocol structure in an LTE system, according to an embodiment. The NR system has a nearly identical protocol structure to the LTE system.

Referring to FIG. 2, a radio protocol of the LTE system is configured of packet data convergence protocols (PDCPs) 205 and 240, radio link controls (RLCs) 210 and 235, and medium access controls (MACs) 215 and 230, in respective UE and eNB. The PDCP 205 and 240 are in charge of operations such as IP header compression/reconstruction, and the RLCs 210 and 235 may reconfigure a PDCP packet data unit (PDU) to an appropriate size.

The MACs 215 and 230 are connected to multiple RLC layer devices configured in one terminal, and may perform operations of multiplexing RLC PDUs with a MAC PDU and demultiplexing the RLC PDUs from the MAC PDU. Physical (PHY) layers) 220 and 225 may perform operations of channel-coding and modulating higher layer data, generating the higher layer data into an OFDM symbol, transmitting the OFDM symbols via a radio channel, or demodulating and channel decoding of the OFDM symbols received via the radio channel, and transferring the OFDM symbol to a higher layer. Further, the physical layer uses a Hybrid ARQ (HARQ) for additional error correction and a receiving terminal transmits 1 bit indicating whether to receive a packet transmitted from a transmitting terminal. This is referred to as HARQ ACK/NACK information. Downlink HARQ ACK/NACK information for uplink transmission may be transmitted through a physical hybrid-ARQ indicator channel (PHICH), and uplink HARQ ACK/NACK information for downlink transmission may be transmitted through a physical uplink control channel (PUCCH) or physical uplink shared channel (PUSCH) physical channel.

Radio resource control (RRC) layers exist at a higher part of the PDCP layer of the UE and the base station, respectively, and the RRC layer may receive or transmit various configuration control messages related to access and measurement for controlling radio resources.

The PHY layer may be configured by one or multiple frequency/carriers, and a technology of simultaneously setting and using multiple frequencies in one base station is called carrier aggregation (CA). Unlike using only one carrier for communication between the UE and the base station (E-UTRAN NodeB, eNB), the CA technology additionally uses a primary carrier and one or multiple secondary carriers to be able to significantly increase transmission capacity as many as the number of secondary carriers. In the LTE and NR system, a cell within the base station using the primary carrier is referred to as a primary cell (PCell) and a cell within the base station using the secondary carrier is referred to as a secondary cell (SCell). A technology for extending the CA function to two base stations is referred to as dual connectivity (DC).

In the DC technology, a UE may be simultaneously connected to a master base station (i.e., a master E-UTRAN NodeB (MeNB)) and a secondary base station (i.e., a secondary E-UTRAN NodeB (SeNB)), and cells belonging to the master base station are called a master cell group (MCG), and cells served by the secondary base station are called a secondary cell group (SCG). Each cell group has a representative cell, and a representative cell of the MCG is referred to as a PCell, and a representative cell of the SCG is called a primary secondary cell (PSCell). When using the aforementioned NR, the MCG uses the LTE technology (i.e., an LTE base station is used for a base station corresponding to the MCG) and the SCG uses the NR (i.e., an NR base station is used for a base station corresponding to the SCG), and thus, the UE may simultaneously use the LTE and the NR. Alternatively, the NR base station may be used for the base station corresponding to the MCG, and the LTE base station may be used for the base station corresponding to the SCG, and the NR and NR base stations may be used for both the MCG and the SCG. As described above, a scenario for connecting different RATs to DC is collectively called multi-RAT DC (MR-DC), and DC between NR and NR is called NR-DC.

In LTE and NR systems, the UE may report PHR information to the base station according to a predetermined condition. The power headroom information denotes a difference between maximum transmission power and transmission power, maximum transmission power being configured for the UE and the transmission power being estimated by the UE. The transmission power estimated by the UE is calculated (a resultant value thereof is called a real value) based on a value used when the UE actually performs uplink transmission, but when the UE does not actually perform uplink transmission, the transmission power estimated by the UE is calculated (a resultant value thereof is called a virtual value) based on a predetermined equation defined in a standard rule. By reporting the power headroom information, the base station may determine available maximum transmittable power of the UE. Meanwhile, when the CA is used, the power headroom information may be transmitted to each secondary carrier.

Figure 3:
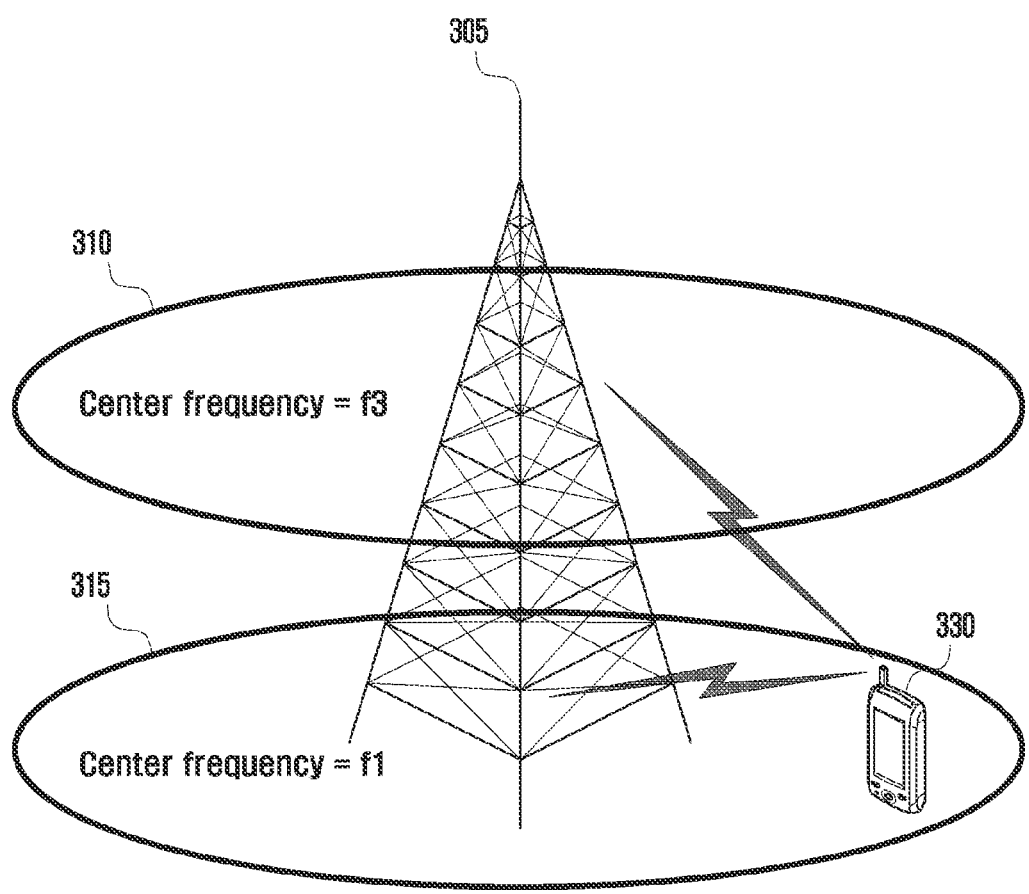
FIG. 3 is a diagram illustrating carrier aggregation in a terminal, according to an embodiment.

FIG. 3 is a diagram illustrating a carrier aggregation technology in a terminal, according to an embodiment.

Referring to FIG. 3, in one base station, multiple carriers are generally transmitted and received through several frequency bands. For example, when a carrier having a center frequency f1 315 and a carrier having a center frequency f3 310 are transmitted from a base station 305, conventionally, one terminal transmits or receives data by using one carrier among the two carriers. However, a terminal having carrier aggregation capability may simultaneously transmit or receive data by using multiple carriers. The base station 305 may allocate more carriers to a terminal 330 having carrier aggregation capability, according to a condition, thereby increasing a transmission rate of the UE 330.

When it is assumed that one cell is generally configured by one forward carrier and one backward carrier which are transmitted or received to or from one base station, CA may be understood in a manner that a UE simultaneously transmits or receives data through multiple cells. Accordingly, a maximum transmission rate is increased in proportion to the number of aggregated carriers.

Herein, the expression of a UE receiving data through a certain forward carrier or transmitting data through a certain backward carrier has the same meaning as the data being transmitted or received using a control channel and a data channel provided by a cell corresponding to a center frequency and a frequency bandwidth which specify a corresponding carrier. Further, the disclosure is described with reference to an LTE system or NR system for convenience of description, but the disclosure may be applied to various wireless communication system that support CA.

Even when CA is performed or not performed, backward transmission (i.e., transmission from a UE to a base station) causes interference in a backward transmission by another cell, and thus, a backward transmission output needs to be maintained at an appropriate level. To this end, when the UE performs backward transmission, the UE calculates a backward transmission output by using a predetermined function, and performs backward transmission based on a calculated backward transmission output. For example, the UE may calculate a value of a requested backward transmission output by inputting, to the certain function, scheduling information such as the amount of an allocated transmission resource, a modulation coding scheme (MCS) level to be applied, or the like and input values such as a path loss value or the like for estimating a channel state, and may perform backward transmission by applying the calculated value of the requested backward transmission output.

The value of the backward transmission output which is applicable to the UE is limited due to a maximum transmission value of the UE, and when the calculated requested value of the backward transmission output is greater than the maximum transmission value of the UE, the UE performs the backward transmission by applying the maximum transmission value. Since the backward transmission output is not sufficient, a quality of the backward transmission may deteriorate. The base station may perform scheduling to prevent a requested transmission output from exceeding the maximum transmission value. However, some parameters including a path loss cannot be detected by the base station, and thus, when necessary, the UE transmits a PHR to report remaining transmission power or a state of an available transmission output of the UE to the base station.

Factors that affect an available transmission output are 1) the amount of an allocated transmission resource, 2) an MCS to be applied to backward transmission, 3) a path loss of an associated forward carrier, 4) an accumulated value of an output control command, or the like. Among the factors, the path loss (PL) or the accumulated value of the output control command may differ according to backward carriers, and thus, when multiple backward carriers are aggregated in one UE, it is reasonable to configure whether to transmit a PHR for each of the backward carriers. However, for efficient transmission of the PHR, one backward carrier may report PHs of multiple backward carriers. According to an operational strategy, a PH may be requested by a carrier that does not actually transmit a PUSCH. Therefore, for this case, it is more efficient that one backward carrier reports all PHs of multiple backward carriers. To this end, an existing PHR has to be expanded. Multiple PHs to be included in one PHR may be configured according to a predetermined order.

A PHR is triggered when a PL of a generally connected forward carrier is changed over a predetermined reference value, when a prohibit PHR timer is expired, or when a predetermined time elapses after the PHR is generated. Even when the PHR is triggered, the UE does not immediately transmit the PHR and stands by until backward transmission is possible, for example, a time point at which a backward transmission resource is allocated. This is because the PHR is not information that should be rapidly processed.

Figure 4:
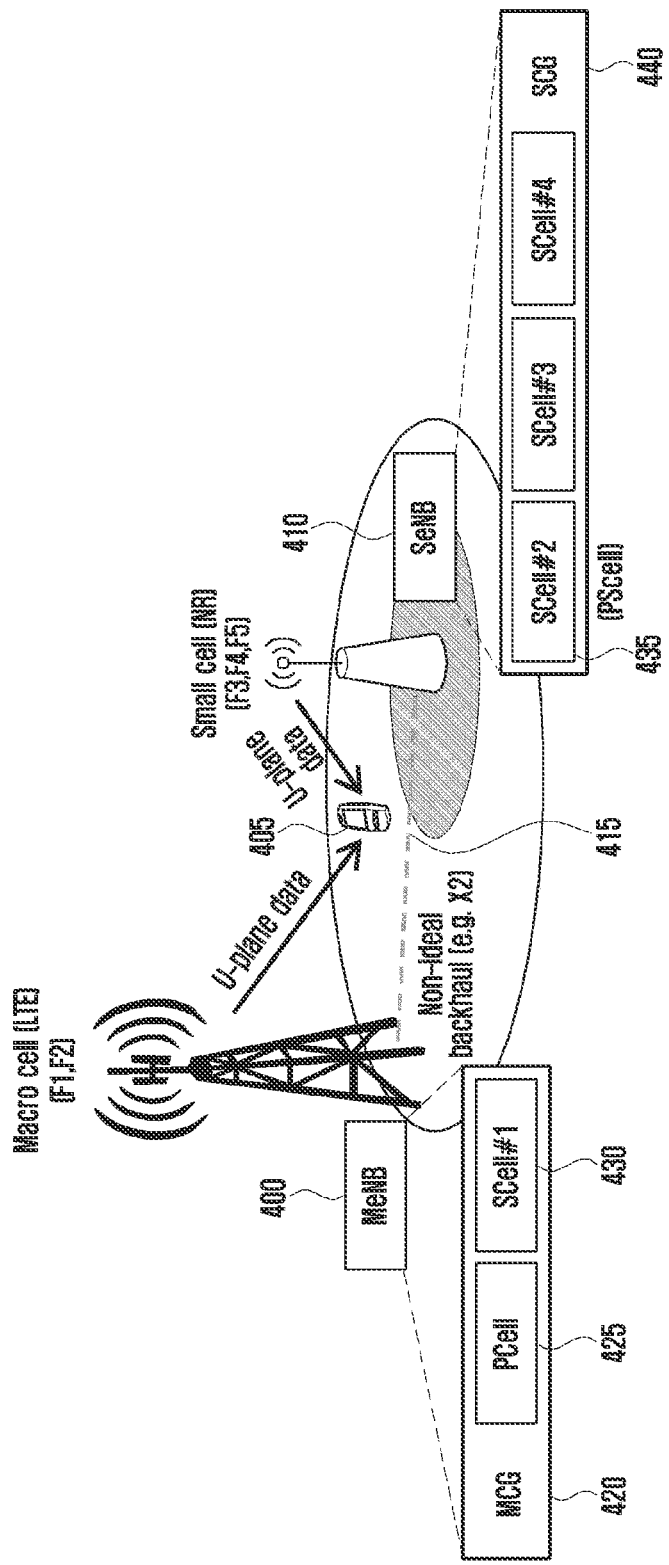
FIG. 4 is a diagram illustrating the concept of multiple connectivity in LTE and NR, according to an embodiment.

FIG. 4 is a diagram illustrating the dual connectivity, according to an embodiment.

By using a DC technology, a UE may be simultaneously be connected to two base stations, and FIG. 4 illustrates when a UE 405 is simultaneously connected to a macro base station 400 using an LTE technology and a small cell base station 410 using an NR technology, and thus, performs data transmission or reception. This is referred to as E-UTRAN-NR dual connectivity (EN-DC).

In the above-described situation, the macro base station 400 is referred to as MeNB, and the small cell base station 410 is referred to as a secondary 5G nodeB (SgNB). Multiple small cells may exist in a service coverage of the MeNB, and the MeNB is connected to the SgNBs via a wired backhaul network 415. A group of serving cells provided from the MeNB is called an MCG 420, and one serving cell in the MCG is certainly a PCell 425 having all functions such as connection establishment, connection re-establishment, handover, or the like which are used to be performed by an existing cell. In the PCell, an uplink control channel has a PUCCH. A serving cell other than the PCell is called an SCell 430.

FIG. 4 illustrates a scenario in which the MeNB provides one SCell, and the SgNBs provides three SCells. A group of serving cells provided by the SgNBs is referred to as an SCG 440.

When the UE transmits or receives data to or from two base stations, the MeNB may transmit, to the SgNB, a command for adding, changing, and removing serving cells provided by the SgNB. In order to transmit the command, the MeNB may configure the UE to measure a serving cell and neighboring cells. According to configuration information, the UE may report a measurement result to the MeNB. In order for the SgNB to efficiently transmits or receives data to or from the UE, the SgNB requires a serving cell to similarly serve as the PCell of the MCG, and in the disclosure, the serving cell is called PSCell 435. The PSCell is configured as one of the serving cells of the SCG, and is characterized in having a PUCCH that is an uplink control channel. The PUCCH is used by the UE to transfer HARQ ACK/NACK information, channel status information (CSI) information, a scheduling request (SR), or the like to a base station.

In the DC scenario, MCG and SCG each have an independent MAC entity. That is, there are two MAC entities in DC. Accordingly, various functions of the MAC (e.g., PHR reporting, etc.) may be performed independently of each other for each base station.

Figure 5A:
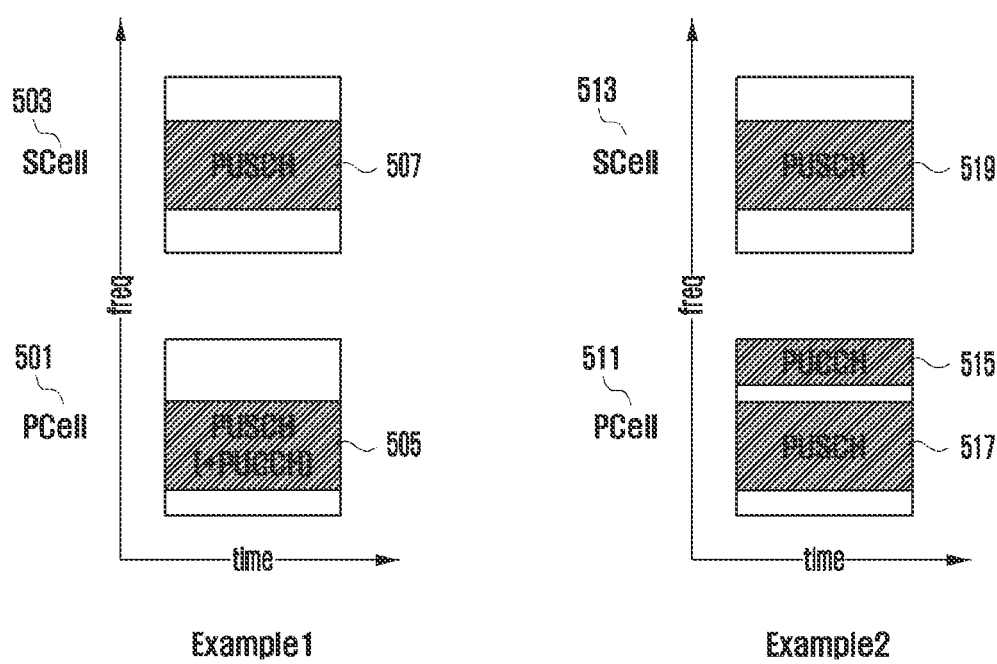
FIG. 5A is a diagram illustrating an uplink transmission method, according to an embodiment.

FIG. 5A is a diagram illustrating an uplink transmission method, according to an embodiment.

In FIG. 5A, Example 1 corresponds to a scenario in which two serving cells, i.e., a PCell 501 and a SCell 503, are configured in a UE and then the UE performs uplink transmission according to scheduling by a base station. In the scenario, the UE cannot simultaneously transmit a PUCCH and a PUSCH in one serving cell due to a limitation in a transmitting method and a RF structure. Accordingly, the UE transmits the PUSCH having PUCCH information embedded therein (indicated by reference numeral 505). The UE transmits the PUCCH information through the PCell, or when there is no PUSCH that is transmitted through the PCell, the UE transmits the PUCCH information through an SCell having a low index from among SCells. The PHR message is transmitted through a part of the PUSCH, and thus, in the scenario, the UE is required to report only a power headroom value obtained by subtracting transmission power from maximum transmission power $P_{CMAX,c}$ of each serving cell, the transmission power being consumed by transmitting the PUSCH (indicated by reference numerals 505 and 507). This is referred to as a Type 1 power headroom.

Example 2 illustrates a scenario in which two serving cells, i.e., a PCell 511 and a SCell 513, are configured for the UE and then the UE performs uplink transmission according to scheduling by a base station. In the scenario, the UE has a capability of simultaneously transmitting a PUCCH and a PUSCH in one serving cell, or separately transmits the PUCCH and the PUSCH by using an uplink transmission technology in which simultaneous transmission is possible. Here, in the PCell (or when the PUCCH transmission through the SCell is possible, the same is applied to the SCell), the UE is required to report a power headroom value obtained by subtracting the transmission power values for PUSCH transmission and PUCCH transmission from maximum transmission power $P_{CMAX,c}$ of the PCell, by considering the transmission power being consumed by not only PUSCH transmission 517 and 519, but also PUCCH transmission 515. This is referred to as a Type 2 power headroom.

When the UE reports the Type 1 power headroom or the Type 2 power headroom, the UE reports a power headroom by using a MAC control element (CE), which is a control message of a MAC layer, and more specifically, the UE may report a power headroom by using a single entry PHR MAC CE format 521 or multiple entry PHR MAC CE format 531. If only a single carrier is used, the UE may use the single entry PHR MAC CE format 521, and if dual connectivity is configured (or CA is configured), the UE may use the multiple entry PHR MAC CE format 531.

When the single entry PHR MAC CE format is used, the UE transmits a power headroom 523 for the serving cell and $P_{CMAX,f,c}$ 525, which is the maximum transmission power of the serving cell.

The value of the power headroom is used for indicating one of the ranges between −32 dB and 38 dB as shown in Table 1 below, and this indicates the available transmission power of the UE.

TABLE 1

| Reported value | Measured quantity value (dB) |
| --- | --- |
| POWER_HEADROOM_0 | PH < −32 |
| POWER_HEADROOM_1 | −32 ≤ PH < −31 |
| POWER_HEADROOM_2 | −31 ≤ PH < −30 |
| POWER_HEADROOM_3 | −30 ≤ PH < −29 |
| . . . | . . . |
| POWER_HEADROOM_53 | 20 ≤ PH < 21 |
| POWER_HEADROOM_54 | 21 ≤ PH < 22 |
| POWER_HEADROOM_55 | 22 ≤ PH < 24 |
| POWER_HEADROOM_56 | 24 ≤ PH < 26 |
| POWER_HEADROOM_57 | 26 ≤ PH < 28 |
| POWER_HEADROOM_58 | 28 ≤ PH < 30 |
| POWER_HEADROOM_59 | 30 ≤ PH < 32 |

TABLE 1-continued

| Reported value | Measured quantity value (dB) |
|---|---|
| POWER_HEADROOM_60 | 32 ≤ PH < 34 |
| POWER_HEADROOM_61 | 34 ≤ PH < 36 |
| POWER_HEADROOM_62 | 36 ≤ PH < 38 |
| POWER_HEADROOM_63 | PH ≥ 38 |

The UE may calculate the available transmission power by using Equation (1) as set forth below, or an equation corresponding thereto.

$$PH_{type1b,f,c}(i, j, q_d, l) = \qquad (1)$$
$$P_{CMAX,f,c}(i) - \{P_{O\_PUSCHb,f,c}(f) + 10\log_{10}(2^\mu \cdot M_{RB,b,f,c}^{PUSCH}(i)) +$$
$$\alpha_{b,f,c}(j) \cdot Pl_{b,f,c}(q_d) + \Delta_{TFb,f,c}(i) + f_{b,f,c}(i, l)\} \quad [dB]$$

In Equation (1), when performing PUSCH transmission at a time point i in a serving cell c (frequency f). PH(i) is calculated based on the maximum backward transmission power $P_{CMAX,f,c}(i)$, the number of resource blocks $M_{CH_{RB,b,f,c}}^{PUS}(i)$, power offset $\Delta_{TF,c}(i)$ derived from the MCS, a path loss $PL_c$, and accumulated TPC commands fc(i). In Equation (1), $PL_c$ denotes the path loss of a cell configured to provide the path loss for the serving cell c. The path loss used for determining backward transmission power of a random serving cell is the path loss of a forward channel of a corresponding cell or the path loss of a forward channel of another cell. The base station selects a path loss to be used among the above path losses through a message of the RRC layer and notifies the UE of the selected path loss.

If the UE uses multiple beams in one cell, the base station notifies the UE of a beam or a reference signal, which will be selected for measurement and calculation. In Equation (1), $f_c(i)$ is the accumulated value of the transmission power control command of the serving cell c. $P_{O\_PUSCH,C}$ denotes a parameter of higher layer, and is configured as the sum of cell-specific and UE-specific values.

Typically, different $P_{O\_PUSCH,C}$ values are applied according to the type of PUSCH transmission such as semi-persistent scheduling, dynamic scheduling, and a random access response. $\alpha_c$ is a 3-bit cell-specific value, which is provided via a higher layer, represents a weighted value applied to a path loss during calculation of downward transmission output (i.e., the greater the weighted value, the more impact path loss has on the downward transmission output), and the weighted value that can be applicable is restricted according to the type of the PUSCH transmission. The value of j is used to indicate the type of PUSCH. The value of j is configured such that j=0 indicates semi-persistent scheduling, j=1 indicates dynamic scheduling, and j=2 indicates a random access response. In Equation (1), if there is no PUSCH transmission in a specific serving cell, $M_{PUSCH}$ and $\Delta_{TF}$ will be unable to be applicable to Equation (1) above according to the definition.

On the other hand, $P_{CMAX,f,c}$, which is the UE maximum transmission power of serving cell c (of frequency f), is determined between $P_{CMAX\_L,f,c}$ and $P_{CMAX\_H,f,c}$ as shown in Equation (2) as set forth below, or determined using an equation corresponding thereto.

$$P_{CMAX\_L,f,c} \leq P_{CMAX,f,c} \leq P_{CMAX\_H,f,c} \text{ with}$$

$$P_{CMAX\_L,f,c} = \text{MIN}\{P_{EMAX,c} - \Delta T_{C,c},$$
$$(P_{PowerClass} - \Delta P_{PowerClass}) - \text{MAX}(\text{MAX}(\text{MPR}_c,$$
$$A\text{-MPR}_c) + \Delta T_{IB,c} + \Delta T_{C,c} + \Delta T_{RxSRS}, P\text{-MPRc})\}$$

$$P_{CMAX\_H,f,c} = \text{MIN}\{P_{EMAX,c}, P_{PowerClass} - \Delta P_{PowerClass}\} \qquad (2)$$

In Equation (2), $P_{CMAX\_H,f,c}$, which is the maximum value of $P_{CMAX,f,c}$, is determined as the minimum value among the value of $P_{EMAX,c}$ that is directly transmittable by the base station and the value of $P_{PowerClass} - \Delta P_{PowerClass}$ that are determined for each frequency band. In addition, in Equation (2), $P_{CMAX\_L,f,c}$, which is the minimum value of $P_{CMAX,f,c}$, is determined as a value which is reduced according to an additional factor from each of the maximum values. For example, the $P_{EMAX,c}$ value, which is directly transmittable by the base station, is reduced by $\Delta T_{C,c} = 1.5$ dB according to band-specific conditions. In addition, the value of $P_{PowerClass} - \Delta P_{PowerClass}$ determined for each frequency band can be reduced by the minimum value of the maximum transmission power of the UE with reference to a larger value among: a value obtained by considering the maximum power reduction (MPRc) that is determined according to the transmission modulation and the transmission bandwidth of the UE, an additional maximum power reduction (A-MPRc) value (or called network signaling (NS) value) determined according to signaling that the base station additionally transmits to the UE in order to reduce interference in neighboring bands, and a power management maximum power reduction (P-MPRc) value used for the purpose of reducing transmission power in order to meet the required value for which electromagnetic wave energy is absorbed into the human body.

For example, in a system operating at a high frequency, such as an NR system, the UE may perform transmission with high power. However, if the transmission is performed with high power, it may be harmful to the human body, and thus, the maximum transmission value can be adjusted according to the required value for regulating the high power transmission. As described above, when the actual transmission power is adjusted by lowering the minimum value of the maximum transmission power according to the P-MPRc value is called power backoff having occurred due to power control (power management).

Figure 5B:
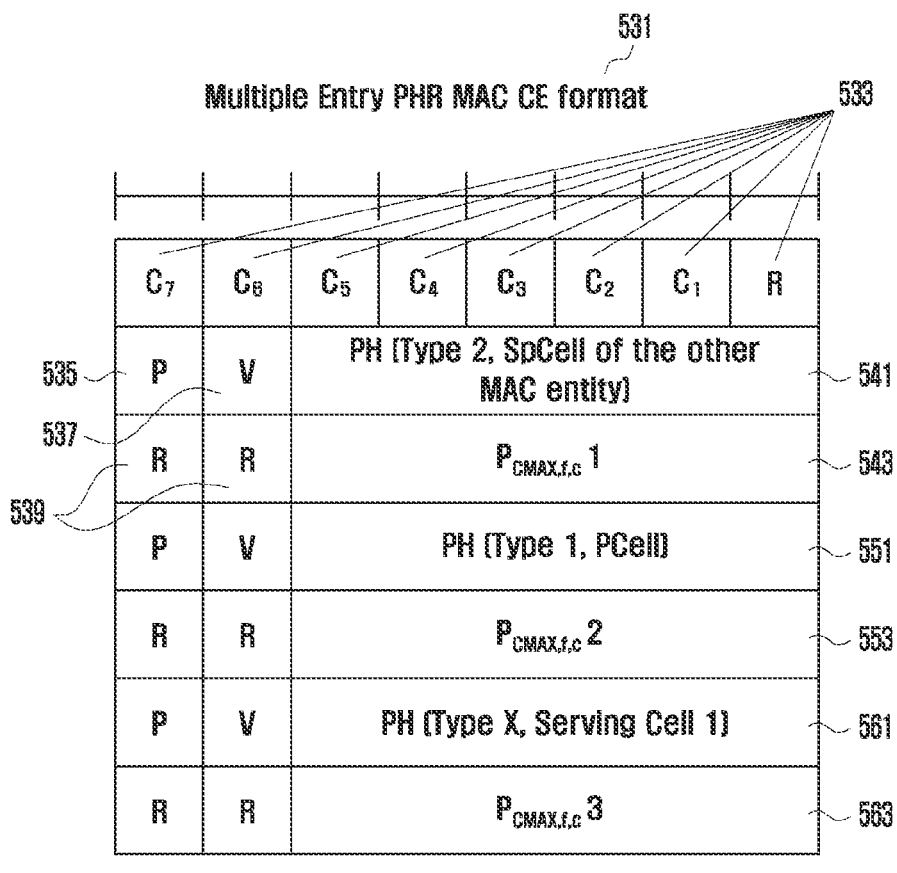
FIG. 5B is a diagram illustrating a multiple entry PHR MAC CE format, according to an embodiment.

FIG. 5B is a diagram illustrating a multiple entry PHR MAC CE format, according to an embodiment.

Referring to FIG. 5B, when the multiple entry PHR MAC CE format is used, the UE indicates, through a bitmap 533, a serving cell to which a power headroom report is transmitted, and for the serving cell to which report is made through the bitmap and serving cells to which unconditional report is made, the power headroom may be configured as reference numerals 541, 551, and 561. In addition, if a report is required, the UE reports $P_{CMAX,f,c}$ values corresponding to the power headroom together (indicated by reference numerals 543, 553, and 563). The UE reports the power headroom by using a field having a length of 6 bits as shown, and in LTE, the power headroom has a value as shown in the Table 2 below.

TABLE 2

| Reported value | Measured quantity value (dB) |
|---|---|
| POWER_HEADROOM_0 | −23 ≤ PH < −22 |
| POWER_HEADROOM_1 | −22 ≤ PH < −21 |
| POWER_HEADROOM_2 | −21 ≤ PH < −20 |
| POWER_HEADROOM_3 | −20 ≤ PH < −19 |
| POWER_HEADROOM_4 | −19 ≤ PH < −18 |
| POWER_HEADROOM_5 | −18 ≤ PH < −17 |
| ... | ... |
| POWER_HEADROOM_57 | 34 ≤ PH < 35 |
| POWER_HEADROOM_58 | 35 ≤ PH < 36 |

TABLE 2-continued

| Reported value | Measured quantity value (dB) |
|---|---|
| POWER_HEADROOM_59 | 36 ≤ PH < 37 |
| POWER_HEADROOM_60 | 37 ≤ PH < 38 |
| POWER_HEADROOM_61 | 38 ≤ PH < 39 |
| POWER_HEADROOM_62 | 39 ≤ PH < 40 |
| POWER_HEADROOM_63 | PH ≥ 40 |

NR may be divided into two frequency ranges, as set forth in Table 3 below, according a frequency range in which a base station operates.

TABLE 3

| Frequency range designation | Corresponding frequency range |
|---|---|
| FR1 | 450 MHz-6000 MHz |
| FR2 | 24250 MHz-52600 MHz |

The transmission power for a UE, required by a base station operating in FR1 and a base station operating in FR2, may be significantly different. Accordingly, a separate table different from Table 2 in LTE may be defined according to each frequency range (i e., each of FR1 and FR2).

For example, Table 4 may be used for PHR reporting for a base station operating in FR 1 among the NR base stations. Table 4 shows the same table as Table 2 in LTE for convenience because there is no significant difference from the frequency range in which LTE operates, but it may have different values.

TABLE 4

| Reported value | Measured quantity value (dB) |
|---|---|
| POWER_HEADROOM_0 | −23 ≤ PH < −22 |
| POWER_HEADROOM_1 | −22 ≤ PH < −21 |
| POWER_HEADROOM_2 | −21 ≤ PH < −20 |
| POWER_HEADROOM_3 | −20 ≤ PH < −19 |
| POWER_HEADROOM_4 | −19 ≤ PH < −18 |
| POWER_HEADROOM_5 | −18 ≤ PH < −17 |
| ... | ... |
| POWER_HEADROOM_57 | 34 ≤ PH < 35 |
| POWER_HEADROOM_58 | 35 ≤ PH < 36 |
| POWER_HEADROOM_59 | 36 ≤ PH < 37 |
| POWER_HEADROOM_60 | 37 ≤ PH < 38 |
| POWER_HEADROOM_61 | 38 ≤ PH < 39 |
| POWER_HEADROOM_62 | 39 ≤ PH < 40 |
| POWER_HEADROOM_63 | PH ≥ 40 |

In addition, for example, Table 5 may be used for PHR reporting for a base station operating in FR1 among the NR base stations.

TABLE 5

| Reported value | Measured quantity value (dB) |
|---|---|
| POWER_HEADROOM_0 | −13 ≤ PH < −12 |
| POWER_HEADROOM_1 | −12 ≤ PH < −11 |
| POWER_HEADROOM_2 | −11 ≤ PH < −10 |
| POWER_HEADROOM_3 | −10 ≤ PH < −9 |
| POWER_HEADROOM_4 | −9 ≤ PH < −8 |
| POWER_HEADROOM_5 | −8 ≤ PH < −7 |
| ... | ... |
| POWER_HEADROOM_57 | 44 ≤ PH < 45 |
| POWER_HEADROOM_58 | 45 ≤ PH < 46 |
| POWER_HEADROOM_59 | 46 ≤ PH < 47 |

TABLE 5-continued

| Reported value | Measured quantity value (dB) |
|---|---|
| POWER_HEADROOM_60 | 47 ≤ PH < 48 |
| POWER_HEADROOM_61 | 48 ≤ PH < 49 |
| POWER_HEADROOM_62 | 49 ≤ PH < 50 |
| POWER_HEADROOM_63 | PH ≥ 50 |

In the case of the multiple entry PHR MAC CE, P bit 535 and V bit 537 may be additionally included.

The P bit may denote information indicating power backoff having occurred due to power management. That is, when the maximum transmission power value of the corresponding serving cell becomes lower than the original value due to the power backoff, the UE may configure the P bit as 1 and report to the base station. Further, the UE may inform the base station that the $P_{CMAX,f,c}$ value, which is reported to the corresponding serving cell by the UE, is a value obtained by adjustment for the above reason.

The V bit may denote information indicating whether uplink transmission to each serving cell is actually performed according to scheduling information at a lime point at which the UE reports the multiple entry PHR MAC CE. At the time point of reporting the multiple entry PHR MAC CE, there will be cases where uplink data is actually transmitted or not transmitted to each serving cell according to scheduling information. When uplink data is actually transmitted, the V bit is configured as "0" and the PH value can be calculated and reported according to the actual transmission. However, when uplink data is not transmitted, the V bit is configured as "1", and a value, which is calculated under the assumption that predetermined virtual transmission has been performed, is reported as "PH". The virtual transmission is called a PUSCH reference format.

The values of the P bit and the V bit may be configured in various methods. In other words, configuring the P bit as "0" may indicate a case where the maximum transmission power value is lower than the original value, and configuring the V bit as "1" may indicate that the PH value is a value calculated according to the actual transmission.

Accordingly, when the current base station reports PHR to each cell activated and configured for the UE, even if the same PH report field as the multiple entry PHR format is used according to a RAT and an operating frequency of the corresponding serving cell, the UE may generate a value by using a table according to the corresponding serving cell type and report the value to the base station.

Even when the single entry PHR MAC CE described above is used, there may be when the values of $P_{CMAX,f,c}$ needs to be lowered due to power backoff having occurred due to power management. To this end, even in the case of single entry PHR MAC CE, a method of notifying the values of $P_{CMAX,f,c}$ including the P bit 557 may be considered.

Figure 5C:
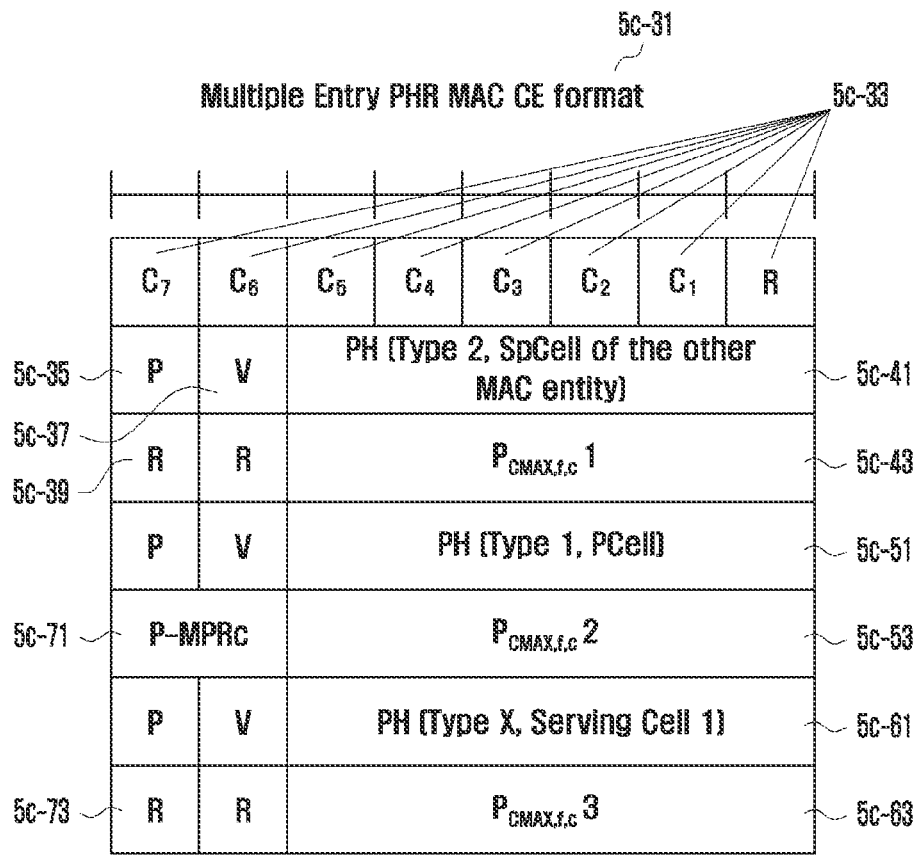
FIG. 5C is a diagram illustrating a multiple entry PHR MAC CE format, according to an embodiment.
Figure 5C:
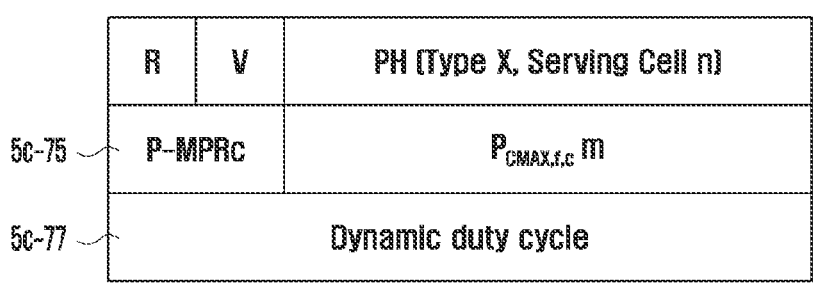
Figure 5C:
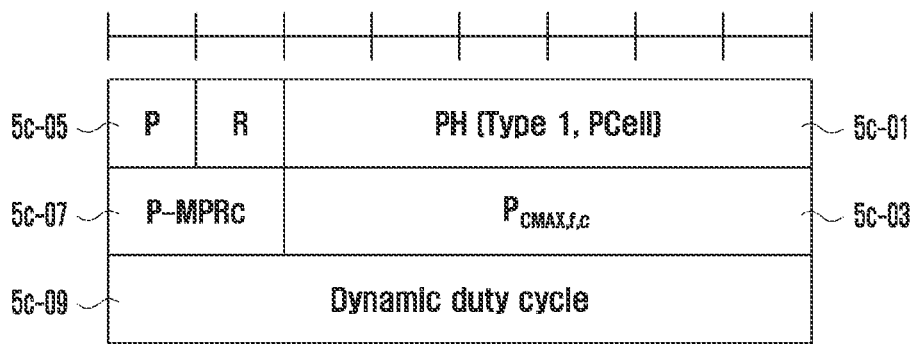

In addition, when the value of $P_{CMAX,f,c}$ needs to be lowered due to power backoff having occurred due to power management, the power headroom may be transmitted using a format shown in FIG. 5C, for detailed reporting, instead of the format described in FIG. 5B. FIG. 5C is a diagram illustrating a multiple entry PHR MAC CE format, according to an embodiment.

When the base station explicitly configures the UE to use a new format, the UE may transmit a report by using the format as indicated in the current example. For example, when the base station configures reportPMPRenabled for the UE by newly introducing a field such as the reportPMPRenabled, both the single entry PHR MAC CE and the multiple entry PHR MAC CE may use a format reporting P-bit and P-MPRc.

That is, in both the single entry PHR MAC CE 5c-51 and multiple entry PHR MAC CE format 5c-31 described in FIG. 5C, compared to FIG. 5B, P-MPRc fields 5c-07, 5c-71, and 5c-75 and dynamic duty cycle fields 5c-09 and 5c-77 are added. Accordingly, remaining reference numerals in FIG. 5C are identical to their counterparts in FIG. 5B.

In more detail, if the UE configures the P bit as "1", for the corresponding cell (c), the P-MPRc value used to lower the transmission power can be explicitly indicated using the P-MPRc fields 5c-07, 5c-71, and 5c-75.

In order to reuse the existing format as much as possible, two reserved bits of the existing format are reused, and accordingly, the maximum number of P-MPRc values that can be reported is four. The four values may be specific values or ranges of values. For example, the four values may indicate such that in case of bit 00, a value between 1 dB and 5 dB is used, and in case of bit 01, a value between 6 dB and 10 dB is used, in case of bit 10, a value between 11 dB and 15 dB is used, and in case of bit 11, a value of 16 dB or more is used. However, the above details are only an embodiment, and the scope of the disclosure is not limited thereto. That is, the P-MPRc value or range indicated by the bit may be variously configured.

If the P bit is configured as "0", a reserved bit is used as in the legacy system instead of the P-MPRc field, or the base station may ignore the P-MPRc field even if the base station receives the contents of the corresponding P-MPRc field. In particular, in the case of using the multiple entry PHR MAC CE, the P bit may be configured as "0" or "1" for each serving cell, and in the case of the serving cell configured as "0", the reserved bit is used as in the legacy system (indicated by reference numeral 5c-73), or the base station may ignore the P-MPRc field even if the base station receives the contents of the corresponding P-MPRc field.

In addition, the dynamic duty cycle fields 5c-09 and 5c-77 are fields that can be included in a case where even one P field is configured as "1" in the corresponding format, and fields indicating the length of time about whether the UE can sustain the power backoff.

The presence or absence of the dynamic duty cycle field is determined by a method of including a dynamic duty cycle field when even one P field is configured as "1", in the case where the base station configures through a separate indicator to use the new format as shown in FIG. 5C. Alternatively, even in the case where the base station configures through a separate indicator to use a new format as shown in FIG. 5C, a method of indicating whether a dynamic duty cycle field is included through an additional separate indicator may be considered.

It is also possible to define a format obtained by adding only the P-MPRc fields 5c-07, 5c-71, and 5c-75 to the new format as shown in FIG. 5C, without the dynamic duty cycle fields 5c-09 and 5c-77. Through this, the base station can obtain information only indicating power reduced and transmitted by the UE.

The base station may accurately identify the amount of the transmission power reduced by the UE and the length of time during which the transmission power is reduced, and thus, may release the corresponding serving cell (especially in the case of SCell) as much as the corresponding time or perform handover to another cell.

Conditions can be defined for when the PHR is transmitted to the base station (i.e., whether to trigger a report), and in LTE and NR systems, the following conditions can be defined.

Condition 1: When a change in downlink reception strength of a serving cell belonging to a random MAC entity configured for a UE is equal to or greater than a value of phr-Tx-PowerFactorChange dB in a state where prohibitPHR-Timer has expired.

That is, according to the above condition, even when a signal strength change occurs in one serving cell among serving cells of an SCG in the DC scenario, the PHR can be reported to the MCG.

Condition 2: When the phr-PeriodicTimer (of the corresponding MAC entity) has expired.

Condition 3: When PHR reporting is initially configured.

Condition 4: When SCell including an uplink corresponding to a random MAC entity is activated.

Condition 5: When PSCell of the SCG is added or changed while a dual connectivity technology is used.

Condition 6: When there is a resource to be transmitted via the uplink of a serving cell corresponding to a random MAC entity configured for a UE in a state where prohibitPHR-Timer has expired, if the amount of transmission power, which should be reduced according to power backoff having occurred due to the power control, requires an amount equal to or greater than a value of phr-Tx-PowerFactorChange in comparison with the previously reported value of the PHR MAC CE.

On the other hand, in the case of condition 6, when there is no P bit like the single entry PHR MAC CE indicated by reference numeral 521, the base station may be difficult to know whether power backoff in the UE has occurred due to power control even when the PHR MAC CE is received. To this end, condition 6 may be modified to condition 6-1 as follows.

Condition 6-1: When there is a resource to be transmitted via the uplink of a serving cell corresponding to a random MAC entity configured for a UE in a state where prohibitPHR-Timer has expired, if the base station is configured to transmit the single entry PHR MAC CE by including the P bit therein, as the format 551 while the multiple PHR MAC CE is used or the multiple PHR MAC CE is not used (i.e., the single entry MAC CE is used); and When the amount of transmission power, which should be reduced according to power backoff having occurred due to the power control, requires an amount equal to or greater than a value of phr-Tx-PowerFactorChange in comparison with the previously reported value of the PHR MAC CE.

In addition, the prohibitPHR-Timer value and the phr-Tx-PowerFactorChange value used in condition 1 is used in condition 6 (or condition 6-1). However, in order to separately control the occurrence of power backoff, the base station may separately configure values for condition 6 and condition 6-1. For example, the base station separately configures the phr-ProhibitTimerPbit value and the phr-Tx-PowerFactorChangePbit value for condition 6 and condition 6-1, and thus may use the additionally configured values instead of prohibitPHR-Timer and phr-Tx-PowerFactorChange values for condition 6 and condition 6-1. The additionally configured values may be transmitted to the UE through, for example, an RRC message. This can be applied to both the (updated) single entry PHR MAC CE and the multiple entry PHR MAC CE.

According to the above condition, if the PHR triggering condition occurs in each base station, the UE may generate a PHR and report the PHR to the corresponding base station.

However, if the dynamic power sharing described above is not supported, if the PHR is triggered due to an event having occurred in another MAC entity other than its own MAC entity, the power headroom value of serving cells corresponding to the corresponding MAC entity may not be reported even if the UE reports the PHR, and accordingly, only the PHR value belonging to its own MAC entity may be transmitted unnecessarily.

Figure 6:
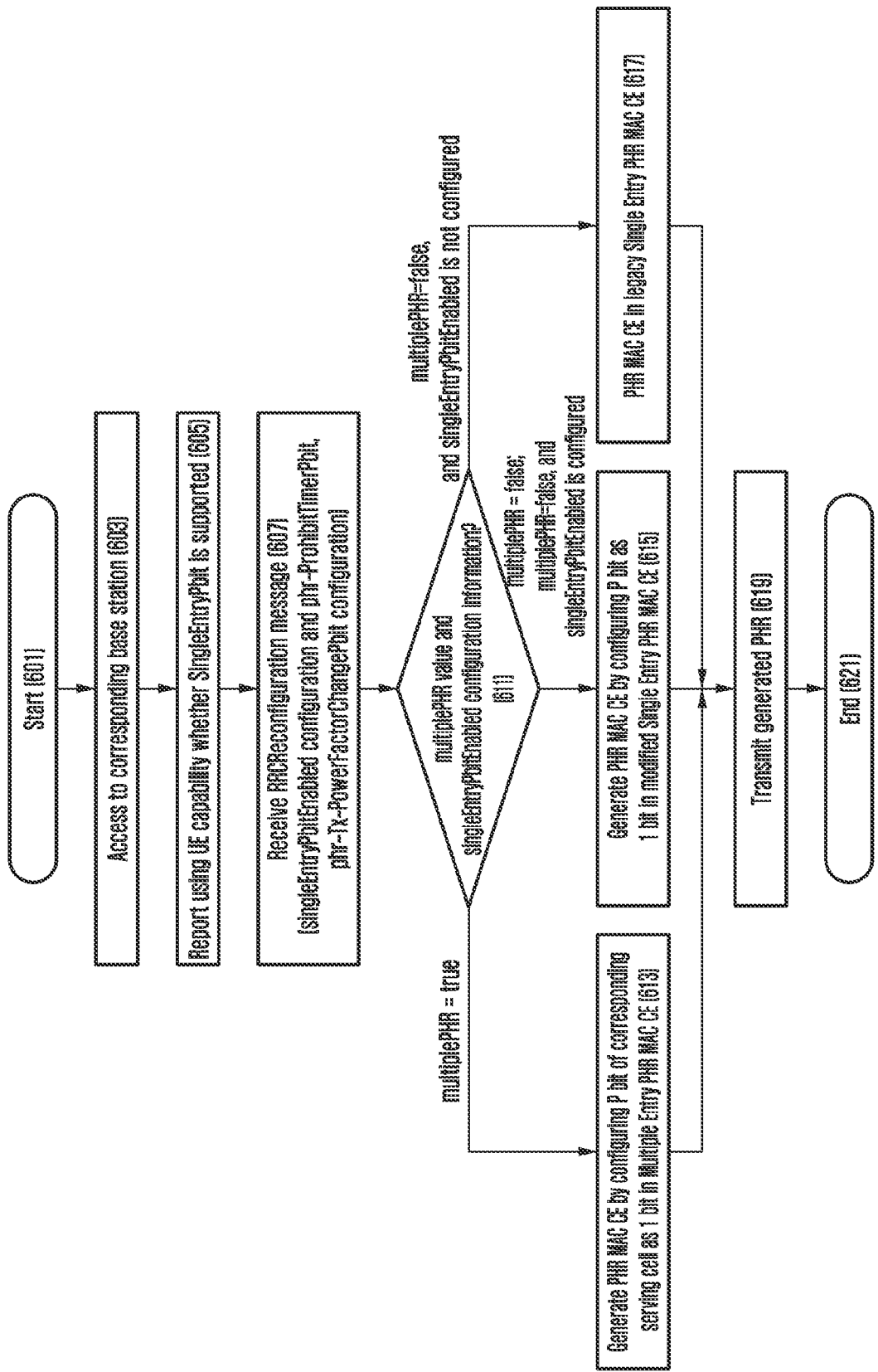
FIG. 6 is a diagram illustrating an operation sequence of a UE according to a method of reporting a PHR when power backoff occurs due to power control, according to an embodiment.

FIG. 6 is a diagram illustrating an operation sequence of a UE according to a method of reporting a PHR when power back-off occurs due to power control, according to an embodiment.

The methodology begins at 601. A UE in a dormant state (IDLE) searches for and selects an appropriate NR base station (or cell), and performs access to the corresponding base station, at 603. To this end, the UE may transmit the RRCRequest message of the RRC layer to a base station, receive an RRCSetup message from the base station accordingly, and transmit an RRCSetupComplete message back to the base station to complete the access procedure.

If the UE has not previously accessed the operator network or if there is no UE capability information in a core network due to movement, the base station may indicate the UE to report the UE capability information by using a UECapabilityEnquiry message of the RRC layer.

Accordingly, the UE may report its own capability information to the base station by using the UECapabilityInformation message of the RRC layer. The UE includes, in the UE capability information, a bit (e.g., singleEntryPbit) indicating whether a format in which P bit is included in the single entry PHR MAC CE is supported and transmit the same to the base station, at 605. In addition, when the base station has the LTE capability information, the operation of transmitting the UECapabilityInformation message may be omitted.

Thereafter, the UE receives an RRCReconfiguration message of the RRC layer from the base station, and the RRCReconfiguration message may include configuration information, at 607.

The configuration information may include configurations relating to PHR reporting. The configuration relating to the PHR report may be included in a phr-Config information element (IE) in the RRCReconfiguration message and transmitted to the UE.

The phr-Config IE may include whether to use multiplePHR, and at least one of values such as phr-ProhibitTimer, phr-PeriodicTimer, and phr-Tx-PowerFactorChange. In addition, according to the UE capability, when the base station configures multiplePHR as "false" (i.e., when the use of single entry PHR MAC CE is configured), the base station may additionally configure the UE to use a format in which P bit described above is included in the single entry PHR MAC CE. For example, a bit such as singleEntryPbitEnabled (e.g., an indicator indicating whether to use a P bit for singlePHR) may be used to indicate whether the P bit is included in the single entry PHR MAC CE.

The configuration information included in the RRC message described above is only an example of the disclosure, and the scope of the disclosure is not limited thereto. For example, some of the information may not be included, and only some of the information may be included.

In addition, if the base station wants to separately control the PHR triggered when power backoff occurs due to the aforementioned power control (power management), the base station may additionally configure phr-ProhibitTimerPbit and phr-Tx-PowerFactorChangePbit, which are new parameters corresponding to the previously used phr-ProhibitTimer and phr-Tx-PowerFactorChange.

If the phr-ProhibitTimerPbit and phr-Tx-PowerFactorChangePbit are not signaled, the UE may determine whether to trigger PHR by using phr-ProhibitTimer and phr-Tx-PowerFactorChange in the PHR triggering condition of condition 6 described above.

However, if the phr-ProhibitTimerPbit and phr-Tx-PowerFactorChangePbit are signaled, the UE may determine whether to trigger PHR by using the phr-ProhibitTimerPbit and phr-Tx-PowerFactorChangePbit based on condition 6 among the conditions in which the PHR is triggered.

In addition, field names such as phr-ProhibitTimer and phr-ProhibitTimerPbit described above are used for convenience of explanation, and may be replaced by terms such as a first prohibit timer and a second prohibit timer. Further, phr-Tx-PowerFactorChange and phr-Tx-PowerFactorChangePbit may be replaced by first received signal strength change information, second received signal strength change information, and the like.

Alternatively, the UE may determine whether to trigger PHR using condition 6-1 instead of condition 6 described above. That is, in a state where prohibitPHR-Timer has expired, when there is a resource to be transmitted via the uplink of a serving cell corresponding to a random MAC entity configured for a UE, when the multiple PHR MAC CE is used, or when multiple PHR MAC CE is not used (i.e., the single entry MAC CE is used), when the base station is configured to transmit the single entry PHR MAC CE by including the P bit therein, as the format 551, when the amount of transmission power, which should be reduced according to power backoff having occurred due to the power control, requires an amount equal to or greater than phr-Tx-PowerFactorChange in comparison with the previously reported value of PHR MAC CE, the UE can trigger the PHR. Additionally, when the phr-ProhibitTimerPbit and the phr-Tx-PowerFactorChangePbit are configured, the UE may substitute the phr-ProhibitTimer and phr-Tx-PowerFactorChange with the phr-ProhibitTimerPbit and phr-Tx-PowerFactorChangePbit in condition 6-1. In a case where the base station configures a separate parameter for power back-off as described above, if a power back-off situation occurs due to the corresponding power control, the UE may determine triggering of the PHR by using the separate parameter, and may report the configuration to the base station more rapidly or more freely according to the configured value.

The UE having received the configuration information transmits a confirmation message for the reception. The RRCReconfigurationComplete message may be used as the confirmation message.

Thereafter, the UE determines whether the following PHR report triggering condition has occurred according to the parameter configured by the base station as described above.

Condition 1: When a change in downlink reception strength of a serving cell belonging to a random MAC entity configured for the UE is equal to or greater than a value of phr-Tx-PowerFactorChange dB in a state where the prohibitPHR-Timer has expired.

Condition 2: When the phr-PeriodicTimer (of the MAC entity) has expired.

Condition 3: When a PHR report is initially configured.

Condition 4: When SCell including an uplink corresponding to a random MAC entity is activated.

Condition 5: When a primary cell (PSCell) of an SCG is added or changed while a dual connectivity technology is used.

Condition 6: When transmission is performed via the uplink of a serving cell corresponding to a random MAC entity configured for a UE in a state where prohibitPHR-Timer has expired, if the amount of transmission power, which should be reduced (according to the transmission power regulation, etc.), requires an amount equal to or greater than a value of phr-Tx-PowerFactorChange, or Condition 6-1: When there is a resource to be transmitted via the uplink of a serving cell corresponding to a random MAC entity configured for a UE in a state where prohibitPHR-Timer has expired, if the base station is configured to transmit the single entry PHR MAC CE by including the P bit therein, as the format 551, while the multiple PHR MAC CE is used or the multiple PHR MAC CE is not used (i.e., the single entry MAC CE is used), or if the amount of transmission power, which should be reduced according to power backoff having occurred due to the power control, requires an amount equal to or greater than a value of phr-Tx-PowerFactorChange in comparison with the previously reported value of the PHR MAC CE.

In a case where phr-ProhibitTimerPbit and phr-Tx-PowerFactorChangePbit are additionally configured, in condition 6 and condition 6-1, the UE substitutes the phr-ProhibitTimer and phr-Tx-PowerFactorChange with the phr-ProhibitTimerPbit and phr-Tx-PowerFactorChangePbit.

In a case where condition 6-1 is used, if singleEntryPbitFnabled is not configured, PHR may not be triggered.

In the embodiment of FIG. 6, it is assumed that power back-off in the UE has occurred due to power control and thus the PHR report is triggered. Accordingly, the UE assumes when the condition 6 or condition 6-1 is satisfied.

Accordingly, the UE determines a MAC CE format to be reported to the PHR according to whether multiplePHR configuration information and singleEntryPbitEnable are configured from the base station at 611.

In a case where multipiePHR is configured as "true" (i.e., when the base station configures CA or DC in the UE), the multiple entry PHR MAC CE is used, and it is possible to configure the PHR MAC CE by configuring P bit included in the MAC CE as "1" (or "0" depending on the configuration), for a serving cell (carrier) in which the power backoff has occurred, and configuring the $P_{CMAX,f,c}$ value of the corresponding serving cell as a value adjusted due to power backoff, at 613.

In a case where multiplePHR is configured as "false" (i.e., when the base station uses only a single serving cell because the base station does not configure CA or DC in the UE), if singleEntryPbitEnabled is not configured, the UE generates the PHR MAC CE by using the legacy single entry PHR MAC CE 521 that does not include a P bit, at 617. In the embodiment of FIG. 6, the PHR is assumed to be triggered, and in a case where condition 6-1 is used as described above, if singleEntryPbitEnabled is not configured, the PHR itself may not be triggered.

In a case where multiplePHR is configured as "false" (i.e., when the base station does not configure CA or DC in the UE and uses only a single serving cell), if singleEntryPbitEnabled is configured, the UE may generate the PHR MAC CE by using the single entry PHR MAC CE including a P bit, as indicated by reference numeral 551. That is, the PHR MAC CE is configured by configuring the P bit as "1" in the current MAC CE, and configuring the $P_{CMAX,f,c}$ value of the corresponding serving cell as a value adjusted due to power backoff, at 615.

Thereafter, the UE reports the generated PHR to the base station, at 619, and notifies the base station of the redundant power of the UE. The methodology ends at 621. Accordingly, the base station may determine the current redundant power of the UE and schedule the UE according thereto.

Figure 7:
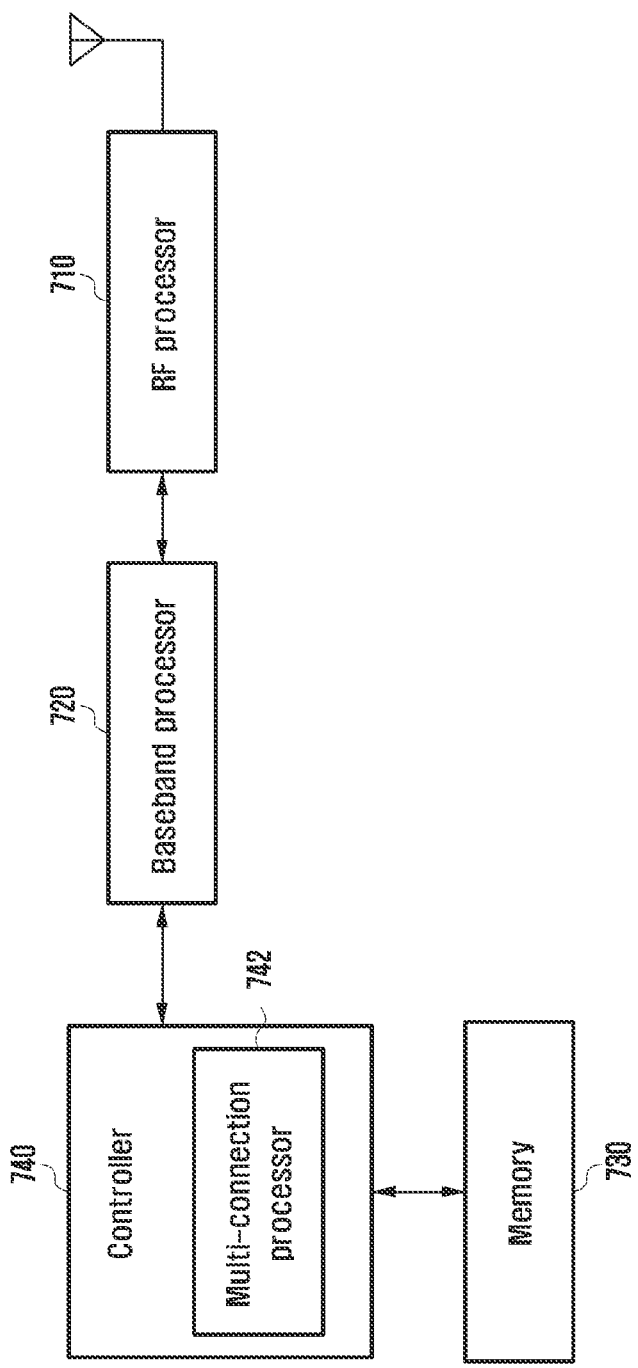
FIG. 7 is a diagram illustrating a block configuration of a UE in a wireless communication system, according to an embodiment.

FIG. 7 is a diagram illustrating a block configuration of a UE in a wireless communication system, according to an embodiment.

Referring to FIG. 7, the UE includes a radio frequency (RF) processor 710, a baseband processor 720, a memory 730, and a controller 740.

The RF processor 710 performs functions including conversion, amplification, or the like of a band of a signal so as to transmit or receive the signal through a wireless channel. That is, the RF processor 710 up-converts a baseband signal provided from the baseband processor 720 to an RF band signal and then transmits the RF band signal via an antenna, and down-converts the RF band signal received via the antenna to a baseband signal. For example, the RF processor 710 may include a transmission filter, a reception filter, an amplifier, a mixer, an oscillator, a digital-to-analog converter (DAC), an analog-to-digital converter (ADC), or the like. Although FIG. 7 illustrates only one antenna, the UE may include a plurality of antennas. Further, the RF processor 710 may include a plurality of RF chains. Furthermore, the RF processor 710 may perform beamforming. For the beamforming, the RF processor 710 may adjust phases and magnitudes of respective signals transmitted or received via the plurality of antennas or antenna elements.

The baseband processor 720 performs a function of conversion between the baseband signal and a bit string according to a physical layer specification of a system. For example, in data transmission, the baseband processor 720 generates complex symbols by encoding and modulating a transmitted bit string. Further, in data reception, the baseband processor 720 reconstructs a received bit string by demodulating and decoding a baseband signal provided from the RF processor 710. For example, when data is transmitted according to an OFDM scheme, the baseband processor 720 generates complex symbols by encoding and modulating a transmitted bit string, maps the complex symbols to subcarriers, and configures OFDM symbols by performing an inverse fast Fourier transform (IFFT) operation and inserting a cyclic prefix (CP). In addition, in data reception, the baseband processor 720 may divide the baseband signal provided from the RF processor 710 into OFDM symbol units and restore the signals mapped to the subcarriers by performing a fast Fourier transform (FFT) operation and then reconstruct the received bit string by demodulating and decoding the signals.

The baseband processor 720 and the RF processor 710 transmit and receive signals as described above. Accordingly, the baseband processor 720 and the RF processor 710 may be referred to as a transmitter, a receiver, a transceiver, or a communicator. Furthermore, at least one of the baseband processor 720 and the RF processor 710 may include a plurality of communication modules to support different wireless access technologies. In addition, at least one of the baseband processor 720 and the RF processor 710 may include different communication modules configured to process signals of different frequency bands. For example, the different wireless access technologies may include a wireless LAN (e.g., IEEE 802.11), a cellular network (e.g., LTE), or the like. Examples of the different frequency bands may include a super-high frequency (SHF) band (e.g., 2.5 GHz or 5 GHz), and a mmWave band (e.g., 60 GHz).

The memory 730 may store data such as a default program, an application program, and configuration information for the operations of the UE. In particular, the memory 730 may store information related to a wireless LAN node that performs wireless communication using a wireless LAN access technology. In addition, the memory 730 provides stored data, in response to a request by the controller 740.

The controller 740 controls overall operations of the UE. For example, the controller 740 transmits or receives signals through the baseband processor 720 and the RF processor 710. Further, the controller 740 records or reads the data in or from the memory 730. To this end, the controller 740 may include at least one processor. For example, the controller 740 may include a communication processor configured to perform communication control and an application processor (AP) configured to control a higher layer such as an application program. According to an embodiment, the controller 740 includes a multi-connection processor 742 configured to perform processing to operate in a multi-connection mode. For example, the controller 740 may perform control such that the UE performs a procedure illustrated in the UE operation illustrated in FIG. 5.

According to an embodiment, the controller 740 determines whether to configure P bit even when the single entry PHR MAC CE is used, according to the UE capability and the configuration information received front the base station, and if it is determined to report the PHR, the controller generates the P bit and instructs the base station to transmit the P bit.

Figure 8:
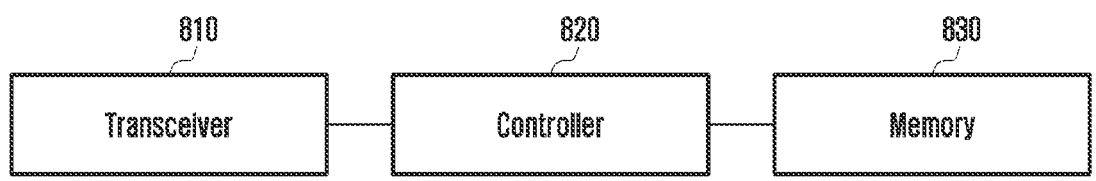
FIG. 8 is a diagram illustrating the structure of a base station, according to an embodiment.

FIG. 8 is a diagram illustrating a structure of a base station, according to an embodiment.

Referring to FIG. 8, the base station includes a transceiver 810, a controller 820, and a memory 830. In the disclosure, the controller may be defined as a circuit, an application-specific integrated circuit, or at least one processor.

The transceiver 810 may transmit or receive signals to or from other network entities. For example, the transceiver 810 may receive UE capability and transmit configuration information to a UE.

The controller 820 may control the overall operation of the base station according to an embodiment provided in the disclosure. For example, the controller 820 may control a signal flow between respective blocks so as to perform an operation according to the flowchart described above. For example, the controller 820 may perform control to receive, from the UE, the PHR determined according to the method described above, and adjust transmission power accordingly so as to transmit data.

The memory 830 may store at least one of information transmitted or received through the transceiver 810 and information generated through the controller 820.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although embodiments have been described in the detailed description of the disclosure, various modifications and changes may be made thereto without departing from the spirit and scope of the disclosure. Therefore, the scope of the disclosure should not be defined as being limited to the embodiments, but should be defined by the appended claims and equivalents thereof.

What is claimed is:

1. A method performed by a terminal in a communication system, the method comprising:
   receiving, from a base station, configuration information including a first power headroom reporting (PHR) configuration including a first prohibit timer and a second PHR configuration including a threshold and a second prohibit timer;
   identifying whether a PHR is triggered based on the configuration information; and
   transmitting, to the base station, the PHR in case that a power management maximum power reduction (P-MPR) value that is applied to meet a required value is greater than or equal to the threshold and the second prohibit timer is not running,
   wherein a field included in the PHR indicates the P-MPR value in case that a P field included in the PHR is set to 1, and
   wherein a length of the field is two bits.

2. The method of claim 1, wherein:
   the field indicates a range of the P-MPR value; and
   field is used as a reserved field in case that the P field is set to 0.

3. The method of claim 1, further comprising:
   starting the second prohibit timer in case that the PHR is triggered,
   wherein the PHR includes a single entry PHR or a multiple entry PHR.

4. A method performed by a base station in a communication system, the method comprising:
   transmitting, to a terminal, configuration information including a first power headroom reporting (PHR) configuration including a first prohibit timer and a second PHR configuration including a threshold and a second prohibit timer; and receiving, from the terminal, a PHR in case that the PHR is triggered, wherein the PHR is triggered in case that a power management maximum power reduction (P-MPR) value that is applied to meet a required value is greater than or equal to the threshold and the second prohibit timer is not running, wherein a field included in the PHR indicates the P-MPR value in case that a P field included in the PHR is set to 1, and wherein a length of the field is two bits.

5. The method of claim 4, wherein:
the field indicates a range of the P-MPR value; and
the field is used as a reserved field in case that the P field is set to 0.

6. The method of claim 4, wherein:
the second prohibit timer is started in case that the PHR is triggered; and
the PHR includes a single entry PHR or a multiple entry PHR.

7. A terminal in a communication system, the terminal comprising:
a transceiver; and
a controller coupled with the transceiver and configured to:
  receive, from a base station, configuration information including a first power headroom reporting (PHR) configuration including a first prohibit timer and a second PHR configuration including a threshold and a second prohibit timer,
  identify whether a PHR is triggered based on the configuration information, and
  transmit, to the base station, the PHR in case that a power management maximum power reduction (P-MPR) value that is applied to meet a required value is greater than or equal to the threshold and the second prohibit timer is not running,
  wherein a field included in the PHR indicates the P-MPR value in case that a P field included in the PHR is set to 1, and
  wherein a length of the field is two bits.

8. The terminal of claim 7, wherein:
the field indicates a range of the P-MPR value; and
the field is used as a reserved field in case that the P field is set to 0.

9. The terminal of claim 7, wherein the controller is further configured to start the second prohibit timer in case that the PHR is triggered, and wherein the PHR includes a single entry PHR or a multiple entry PHR.

10. A base station in a communication system, the base station comprising:
a transceiver; and
a controller coupled with the transceiver and configured to:
  transmit, to a terminal, configuration information including a first power headroom reporting (PHR) configuration including a first prohibit timer and a second PHR configuration including a threshold and a second prohibit timer, and
  receive, from the terminal, a PHR in case that the PHR is triggered,
  wherein the PHR is triggered in case that a power management maximum power reduction (P-MPR) value that is applied to meet a required value is greater than or equal to the threshold and the second prohibit timer is not running,
  wherein a field included in the PHR indicates the P-MPR value in case that a P field included in the PHR is set to 1, and
  wherein a length of the field is two bits.

11. The base station of claim 10, wherein:
the field indicates a range of the P-MPR value,
the field is used as a reserved field in case that the P field is set to 0,
the second prohibit timer is started in case that the PHR is triggered, and
the PHR includes a single entry PHR or a multiple entry PHR.

* * * * *